United States Patent

Hadley

Patent Number: 5,975,337
Date of Patent: Nov. 2, 1999

[54] THERMAL BABY BOTTLE WARMER

[76] Inventor: Mary Lynne Hadley, Box 1488, Hope, BC, Canada, V0X 1L0

[21] Appl. No.: 09/174,341

[22] Filed: Oct. 15, 1998

[51] Int. Cl.[6] ..................................................... F17C 1/02
[52] U.S. Cl. ............................ 220/592.17; 220/592.15; 220/23.8; 220/592.25; 220/592.22; 220/592.28; 165/80.5
[58] Field of Search ................................ 165/80.1, 80.5; 220/574.2, 592.15, 592.17, 592.2, 592.28, 739, 592.22, 592.25, 23.8

[56] References Cited

U.S. PATENT DOCUMENTS

| | | | |
|---|---|---|---|
| 4,597,435 | 7/1986 | Fosco | 165/80.5 |
| 4,782,670 | 11/1988 | Long et al. | 165/80.5 |
| 5,653,343 | 8/1997 | Imal | 220/23.8 |
| 5,810,196 | 9/1998 | Lundy | 220/23.8 |

Primary Examiner—Carroll B. Dority

[57] ABSTRACT

A thermal baby bottle warmer for maintaining a baby bottle at an elevated temperature comprising a thermal baby bottle which has a closed lower end and an open upper end with an exterior side wall therebetween. The baby bottle warmer also has an interior wall that is formed integrally with the thermos bottle and extends downwardly adjacent the upper end of the thermos bottle with insulation material between the side wall and lower end of the thermos bottle. A liner is provided and is adapted to receive a baby bottle and having a closed lower end and an open upper end positioned within the interior wall to define a space for receiving hot water between the lower and side walls of the liner and interior wall with a spring-urged clip adapted to retain the liner within the thermos. Also provided is a threaded lip which extends upwardly from the upper edge of the liner and thermos bottle with interior threads and exterior threads. An interior sealing lid is provided with male threads for selectively coupling with the interior threads of the lid. An exterior lid is formed as a dish with female threads for selectively coupling with the threads of the lid over the interior lid.

7 Claims, 2 Drawing Sheets

THERMAL BABY BOTTLE WARMER

BACKGROUND OF THE INVENTION

1. Field of the Invention

The present invention relates to a thermal baby bottle warmer and more particularly pertains to maintaining a baby bottle at an elevated temperature.

2. Description of the Prior Art

The use of child care accessories of various designs and configurations is known in the prior art. More specifically, child care accessories of various designs and configurations heretofore devised and utilized for the purpose of keeping food for infants at a preselected temperature through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,597,435 to Fosco, Jr. discloses a Bottle Warmer or Cooler. U.S. Pat. No. 3,658,122 to Kalyk discloses a Baby Bottle Warming Container and Method of Attaining Thermal Equilibrium. U.S. Pat. No. Des. 257,549 to Chapman discloses a Combined Bottle Warmer and Measuring Spoon. U.S. Pat. No. 4,163,471 to Leder discloses a Forced Convection Heat Exchanger for Warming Articles. U.S. Pat. No. Des. 308,154 to Tow discloses a Baby Bottle Warmer. Lastly, U.S. Pat. No. 3,402,763 to Peterson discloses a Device for Warming or Cooling Infant Food.

In this respect, the thermal baby bottle warmer according to the present invention substantially departs from the conventional concepts and designs of the prior art, and in doing so provides an apparatus primarily developed for the purpose of maintaining a baby bottle at an elevated temperature.

Therefore, it can be appreciated that there exists a continuing need for a new and improved thermal baby bottle warmer which can be used for maintaining a baby bottle at an elevated temperature. In this regard, the present invention substantially fulfills this need.

SUMMARY OF THE INVENTION

In view of the foregoing disadvantages inherent in the known types of child care accessories of various designs and configurations now present in the prior art, the present invention provides an improved thermal baby bottle warmer. As such, the general purpose of the present invention, which will be described subsequently in greater detail, is to provide a new and improved thermal baby bottle warmer and method which has all the advantages of the prior art and none of the disadvantages.

To attain this, the present invention essentially comprises a new and improved thermal baby bottle warmer system for maintaining a baby bottle at an elevated temperature comprising, in combination a thermal baby bottle warmer which has a closed lower end and an open upper end with an exterior side wall therebetween. Also provided is a storage chamber coupled to the side wall having an enlarged lower component for receiving a utensil and an upper component pivotally coupled by a hinge to the side wall about the vertical axis immediately above the lower component for selectively allowing access to the utensil in the lower compartment. Further provided is an interior wall formed integrally with the thermos bottle and extending downwardly adjacent the upper end of the thermos bottle with insulation material between the side wall and lower end of the thermos bottle. A liner is provided and is adapted to receive a baby bottle. The liner has a closed lower end and an open upper end positioned within the interior wall to define a space for receiving hot water between the lower and side walls of the liner and interior wall with a spring-urged clip adapted to retain the liner within the thermos. A threaded lip extends upwardly from the upper edge of the liner and thermos bottle with interior threads and exterior threads. A handle is provided for pivotally securing to the thermos bottle adjacent to its upper edge. Also provided is an interior sealing lid with male threads for selectively coupling with the interior threads of the lid. Lastly provided is an exterior lid formed as a dish with female threads for selectively coupling with the threads of the lid over the interior lid.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved thermal baby bottle warmer which has all of the advantages of the prior art child care accessories of various designs and configurations and none of the disadvantages.

It is another object of the present invention to provide a new and improved thermal baby bottle warmer which may be easily and efficiently manufactured and marketed.

It is further object of the present invention to provide a new and improved thermal baby bottle warmer which is of durable and reliable constructions.

An even further object of the present invention is to provide a new and improved thermal baby bottle warmer which is susceptible of a low cost of manufacture with regard to both materials and labor, and which accordingly is then susceptible of low prices of sale to the consuming public, thereby making such thermal baby bottle warmer economically available to the buying public.

Even still another object of the present invention is to provide a thermal baby bottle warmer for maintaining a baby bottle at an elevated temperature.

Lastly, it is an object of the present invention to provide a new and improved thermal baby bottle warmer for maintaining a baby bottle at an elevated temperature comprising a thermal baby bottle which has a closed lower end and an open upper end with an exterior side wall therebetween. The baby bottle warmer also has an interior wall that is formed integrally with the thermos bottle and extends downwardly adjacent the upper end of the thermos bottle with insulation material between the side wall and lower end of the thermos bottle. A liner is provided and is adapted to receive a baby bottle and having a closed lower end and an open upper end positioned within the interior wall to define a space for receiving hot water between the lower and side walls of the liner and interior wall with a spring-urged clip adapted to retain the liner within the thermos. Also provided is a threaded lip which extends upwardly from the upper edge of the liner and thermos bottle with interior threads and exterior threads. An interior sealing lid is provided with male threads for selectively coupling with the interior threads of the lid. An exterior lid is formed as a dish with female threads for selectively coupling with the threads of the lid over the interior lid.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
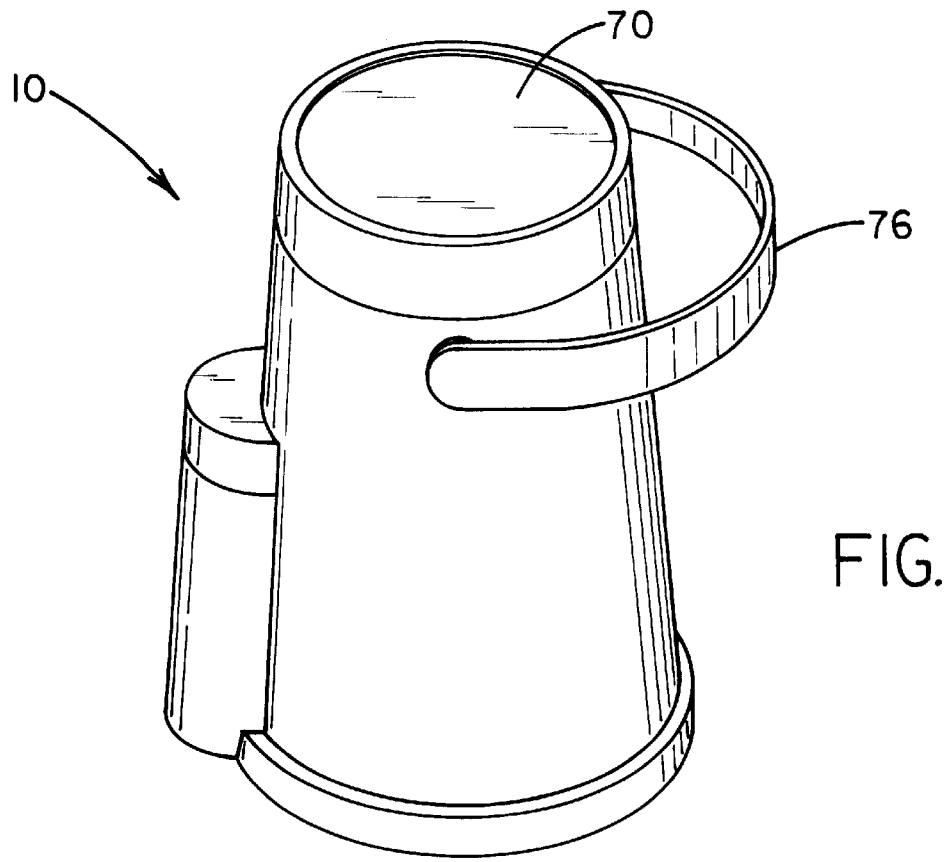
FIG. 1 is a perspective view of the thermal baby bottle warmer constructed in accordance with the principles of the present invention.
Figure 2:
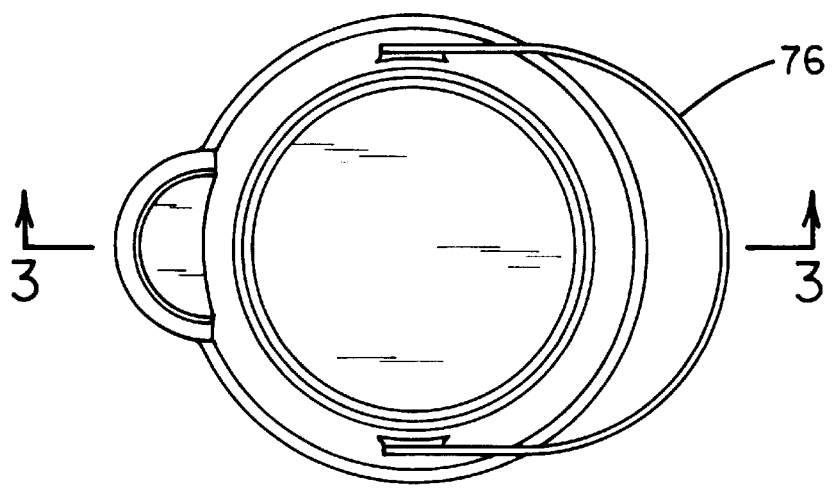
FIG. 2 is a top elevational view of the device shown in FIG. 1.
Figure 4:
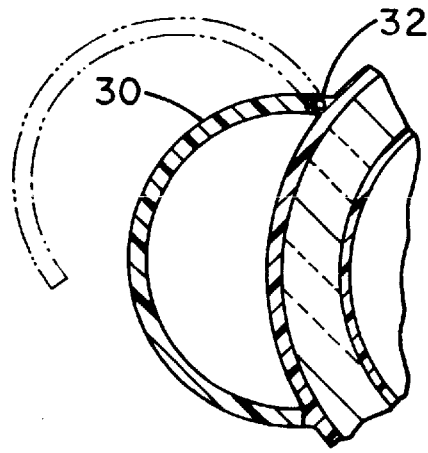
FIG. 4 is a cross-sectional view taken along line 4—4 of FIG. 3.
Figure 5:
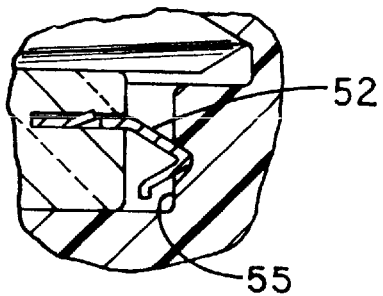
FIG. 5 is an enlarged illustration of the coupling components taken at circle 5 of FIG. 3.

With reference now to the drawings, and in particular to FIG. 1 thereof, the preferred embodiment of the new and improved thermal baby bottle warmer embodying the principles and concepts of the present invention and generally designated by the reference numeral 10 will be described.

The present invention, the thermal baby bottle warmer 10 is comprised of a plurality of components. Such components are individually configured and correlated with respect to each other so as to attain the desired objective.

More specifically, the new and improved thermal baby bottle warmer system for maintaining a baby bottle at an elevated temperature comprises, in combination a thermal baby bottle warmer 14 which has a closed lower end 16 and an open upper end 18 with an exterior side wall 20 therebetween. The warmer 14 preferably has an inverted frustoconical configuration.

Also provided is a storage chamber 24 coupled to the side wall having an enlarged, arcuate lower component 26 for receiving a utensil 28. The storage chamber is further equipped with an upper component 30 pivotally coupled by a hinge 32 to the side wall about a vertical axis immediately above the lower component for selectively allowing access to the utensil in the lower compartment. The storage chamber ideally has a height about ½ that of the warmer 14.

Figure 3:
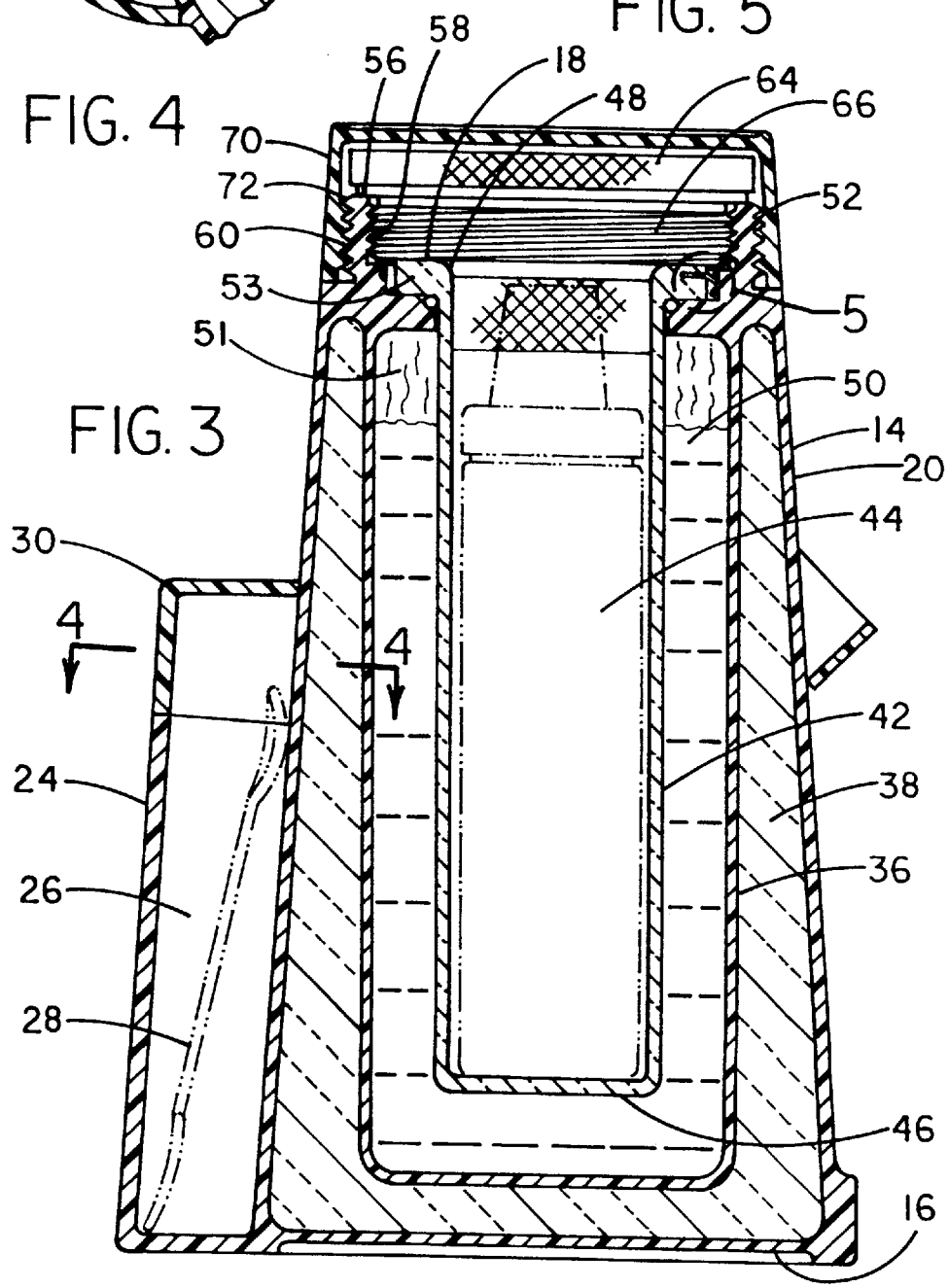
FIG. 3 is a cross-sectional view taken along line 3—3 of FIG. 2.

Further provided is a cylindrical interior wall 36 formed integrally with the thermos bottle and extending downwardly adjacent the upper end of the thermos bottle. Insulation material 38 is positioned between the side wall, interior wall, and lower end of the thermos bottle. As shown in FIG. 3, the interior wall and side wall converge at upper ends thereof.

A cylindrical liner 42 is provided and is adapted to receive a baby bottle 44. The liner has a closed lower end 46 and an open upper end 48. The linear has a diameter less than that of the interior wall of the warmer 14. As such, when the liner is positioned within the interior wall 36, a space is defined for receiving hot water 50 between the lower and side walls of the liner and interior wall.

The interior wall preferably has an upper inwardly extending flange 51 on which an upper radially extending peripheral lip 53 of the liner rests. A gasket is preferably positioned between the interior wall and the liner. The peripheral lip of the liner is equipped with a spring-urged, V-shaped clip 52 which is adapted to snappily engage an annular recess formed in an upwardly extending annular extension 55 of the interior wall.

A threaded lip 56 extends upwardly from the upper edge of the interior wall and further remains radially offset from the annular extension of the interior wall. The threaded lip preferably has threaded grooves formed on both an outer and inner surface thereof.

A U-shaped handle 76 is provided for pivotally securing to the thermos bottle adjacent to its upper edge. Also provided is an interior sealing lid 64 with male threads 66 for selectively coupling with the interior threads 58 of the lid. Lastly provided is an exterior lid 70 formed as a dish with female threads 72 for selectively coupling with the threads of the lid over the interior lid.

As described hereinabove, the thermal baby bottle system is a self-contained accessory for warming a baby bottle that relies on a ready source for electricity or hot water. The baby bottle warmer is a thermal unit with a removable inner liner. Like a standard thermos bottle, the baby bottle warmer has an inner, insulated heat-sealing lid and an outer plastic lid that also functions as a cup or dish. To use the baby bottle, hot water is added to the outer thermal unit, using the dish/lid to measure the correct amount. The inner liner is then inserted creating a seal as it comes to rests on a lip within the unit and both lids are screwed onto the unit. The hot water is sealed between the inner liner and the outer unit, and remains hot within the thermal unit for several hours. When a parent wishes to warm a bottle, he or she simply places it into the inner liner, closes the lid and waits approximately five minutes, depending on the temperature of the water and the desired temperature of the bottle.

The outer thermal unit of the baby bottle features an attached compartment for a combination spoon/fork. This half-cylinder compartment is attached to the outer plastic wall of the unit and is also plastic.

The thermal baby bottle provides everything necessary to prepare a baby's meal in a single, convenient unit. It utilizes the insulating qualities of a thermos bottle to keep a supply of hot water at a constant temperature until it is needed to heat a baby bottle. The baby bottle is a compact, completely portable accessory for parents. It does not require any external power source or access to hot water for operation and ensures that parents can warm a bottle for their baby whenever it is needed.

The appealing features of the thermal baby bottle warmer is its convenient design, ease of use and practicality. The thermal baby bottle warmer is a valuable accessory for many busy parents. This device allows parents the freedom of traveling or pursuing leisure activities with their babies with the assurance that they are able to warm a bottle of formula or milk when they desire. In addition, since the temperature of this accessory is maintained for several hours, the thermal baby bottle can be used for more than one feeding.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new and improved thermal baby bottle warmer for maintaining a baby bottle at an elevated temperature comprising, in combination:

a thermal bottle having a closed lower end and an open upper end with an exterior side wall therebetween;

a storage chamber coupled to the side wall having an enlarged lower component for receiving a utensil and an upper component pivotally coupled by a hinge to the side wall about the vertical axis immediately above the lower component for selectively allowing access to the utensil in the lower compartment;

an interior wall formed integrally with the thermos bottle and extending downwardly adjacent the upper end of the thermos bottle with insulation material between the side wall and lower end of the thermos bottle;

a liner adapted to receive a baby bottle and having a closed lower end and an open upper end positioned within the interior wall to define a space for receiving hot water between the lower and side walls of the liner and interior wall with a spring-urged clip adapted to retain the liner within the thermos;

a threaded lip extending upwardly from the upper edge of the liner and thermos bottle with interior threads and exterior threads;

a handle pivotally secured to the thermos bottle adjacent to its upper edge;

an interior sealing lid with male threads for selectively coupling with the interior threads of the lid; and an exterior lid formed as a dish with female threads for selectively coupling with the threads of the lid over the interior lid.

2. A thermal baby bottle warmer for maintaining a baby bottle at an elevated temperature comprising:

a thermal bottle having a closed lower end and an open upper end with an exterior side wall therebetween for releasably receiving a baby bottle therein; and a compartment mounted on an outer surface of the exterior side wall for containing utensils therein.

3. A thermal baby bottle warmer as set forth in claim 2 wherein the thermal bottle includes an interior side wall with insulation formed between the exterior side wall and the interior side wall.

4. A thermal baby bottle warmer as set forth in claim 2 and further including a liner removably mounted within the thermal bottle, wherein a bottom face and a side wall of the liner is spaced from the thermal bottle when inserted therein for situating a heated medium therebetween.

5. A thermal baby bottle warmer as set forth in claim 2 wherein the liner is snappily engaged within the thermal bottle.

6. A thermal baby bottle warmer as set forth in claim 2 and further including a U-shaped handle pivotally mounted on the thermal bottle.

7. A thermal baby bottle warmer as set forth in claim 2 wherein the compartment includes a cover pivotally coupled to the thermal bottle about a vertical axis.

* * * * *